INVENTORS:
THOMAS E. SCHNEIDER, JR.
MARION R. CARSTENS
BY HOMER J. BATES
Newton, Hopkins & Jones
ATTORNEYS

United States Patent Office 3,323,539
Patented June 6, 1967

3,323,539
CHEMICAL FEEDING DEVICE
Thomas E. Schneider, Jr., c/o Tesco Chemicals, Inc., P.O. Box 6286, Station H, Atlanta, Ga. 30308; Marion R. Carstens, 2394 Lively Trail NE., Atlanta, Ga. 30329; and Homer J. Bates, 35 Woodstock St., Roswell, Ga. 30075
Filed Oct. 12, 1964, Ser. No. 403,968
3 Claims. (Cl. 137—268)

This application relates to a method of and means for supplying a chemical or chemicals to liquid in a controlled manner proportionate to the rate of liquid flow.

While certain aspects of the present inventive concept may be applicable in the feeding of wide varieties of substances to wide varieties of liquids, the present illustrative embodiment of the invention is presented as a means for and method of supplying chlorine to water for the purification of swmiming pools. The present application is a companion application of the application of Thomas E. Schneider, Jr., Ser. No. 314,754, filed Oct. 8, 1963, entitled, "Feeder Device," now U.S. Patent No. 3,203,440, which is hereby incorporated by way of reference since certain objects, features and advantages of the present invention are common to certain objects, features and advantages of said application, and since both the present and the aforementioned application have a common assignee.

The chlorination of swimming pool waters has long been accomplished by the periodic treatment of the water with a relatively insoluble chlorine compound in granular pellet form. Such procedure is frequently uneconomical, inefficient and ineffective. To effect an adequately sustained chlorine content, the quantity of relatively insoluble chlorine compound periodically administered is necessarily excessive since substantial amounts of chlorine gas are immediately liberated to the atmosphere without effective purification of the water. Further, the maintenance of adequate chlorine content by such periodic application of soluble chlorine is subject to human frailties of memory and judgment. Methods and apparatus have also been developed for the chlorination of swimming pool water by the use of chlorine in gaseous form. However, such apparatus and methods are expensive as to manufacturing, installation and maintenance, and are lethally dangerous in that such apparatus is subject to leak of the chlorine gas.

In common with the invention of the aforementioned application of Thomas E. Schneider, Jr., the present invention provides for the chlorination of the swimming pool water by contact of circulated swimming pool water with a solid relatively insoluble body of chlorine bearing compound. Since the quantity and velocity of pool water circulated in contact with the body of chlorine bearing compound may be readily adjusted, the degree of chlorination may be easily controlled. Further in common with the invention of said prior application, the present invention provides for the forceful impingement of circulated waters against the solid chlorine bearing compound whereby it may be more rapidly eroded to enhance the rate of supply of liberated chlorine to the waters. Unlike the aforementioned application, however, the present invention provides for the uniform dissolution or erosion of the solid chlorine bearing compound by the simultaneous impingement of jet streams at a multiplicity of points at the end of a circular stick of the material and for a control of the pressure of said jets.

Therefore, it is among the primary objects of the present invention to provide means for and method of chlorinating the waters of a swimming pool by the circulation thereof in contact with a solid body of relatively insoluble chlorine bearing compound. A further object of the invention is to provide an improved method and means by which a solid body of chlorine bearing compound, in stick form, may be uniformly dissolved as eroded into the circulated waters of a swimming pool. Another object is to provide readily adjustable means for controlling the rate of dissolution or erosion in response to forceful impingement of the waters against the material. It is also an object of the invention to provide a method of and means for positively precluding excessive pressure of the water impinging against the solid chlorine compound. The objectives of the invention further include that of providing liquid responsive flow control means precluding air entraining through the chamber and a resultant air lock of the pump.

These and other objects, features and advantages of the present invention will be more clearly understood from the following detailed description and the accompanying drawings in which like characters of reference designate the corresponding parts in the figures of the drawings and in which.

Figure 1:
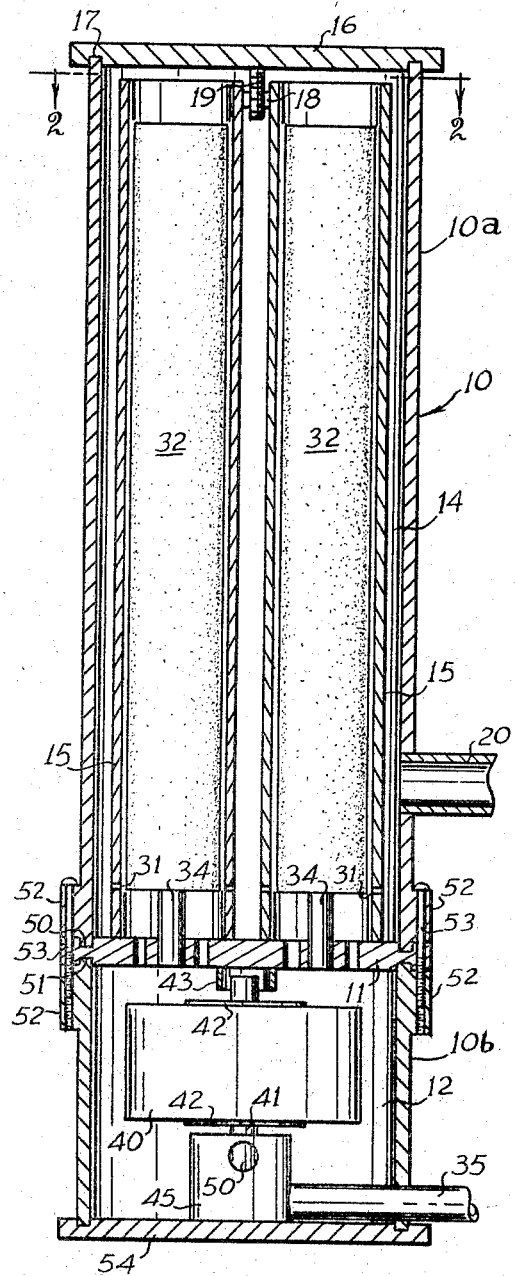
FIG. 1 is a vertical sectional view of one embodiment of the treatment chamber of the present invention.
Figure 2:
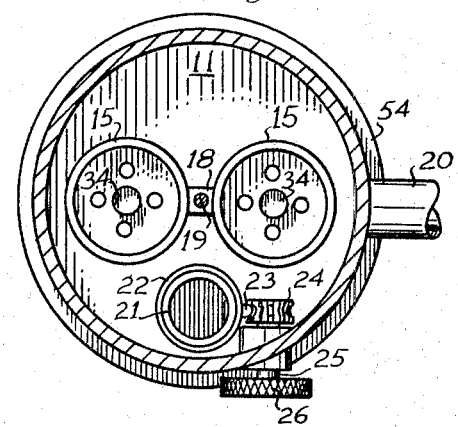
FIG. 2 is a horizontal transverse section taken on the lines 2—2 of FIG. 1 with chlorine bearing compound sticks removed.

Referring now to FIGS. 1 and 2 of the drawings, the treatment chamber of the present form of the invention includes an enclosing cylinder 10. Within the cylinder 10 there is provided a transverse apertured wall 11 adjacent the lower end which defines therebelow a treated water outlet chamber 12. Above the transverse wall 11 an upper water inlet chamber 14 provides for the reception of one or more, here shown as two, open ended, spaced, cylindrical, solid chlorine compound, receiving tubes 15. The upper open end of the cylinder 10 is normally closed by a removable cap 16 engaging the upper edge of the cylinder 10 within its annular recess 17. For securing the cap 16 in sealing engagement with the upper end of the cylinder 10, an internally threaded bridge 18 spans the spaced tubes 15 while the cap is formed with a central depending externally threaded shank 19. Their interengagement threadedly locks the cap in position.

Figure 3:
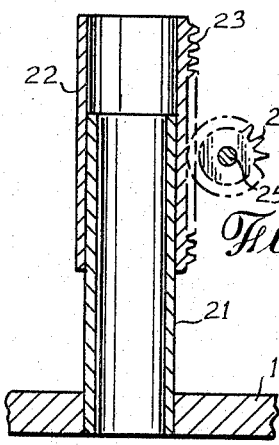
FIG. 3 is a detail vertical section of the standpipe and its actuating means.
Figure 4:
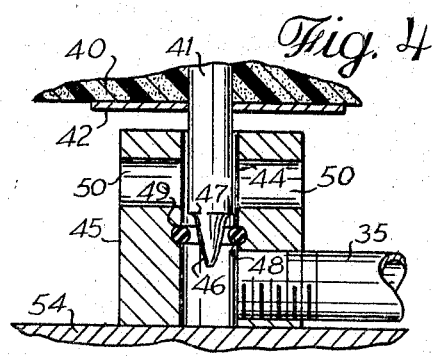
FIG. 4 is a detail vertical section of the valve of the liquid responsive flow control means.

The pool water to be chlorinated is supplied to the water inlet chamber 14 through a supply pipe 20. The head of water which may accumulate within the upper chamber 14 is limited by the effective height of a standpipe 21. To increase or decrease the head of water, and hence the water pressure at the lower end of the chamber 14, a slidable nipple 22 is applied to the upper end of the standpipe 21. For adjusting the relative position of the nipple 22 on the stand-pipe 21, and hence the effective height of the stand-pipe, a rack 23 is formed on one side of the nipple. A gear 24 mounted on a shaft 25 extending through the wall of the cylinder 10 (see FIGS. 2 and 3) engages the rack 23. Externally of the cylinder 10 the shaft 25 is provided with a knurled operating head 26 by the operation of which the nipple may be raised or lowered.

Each of the solid chlorine compound receiving tubes 15 is mounted over and surrounds a group of discharge ports 30 extending through the transverse wall 11 to the outlet chamber 12. Adjacent the lower end of each tube 15 there is provided a series of circumferentially spaced, preferably equidistant, jet ports 31 for directing jet streams of water, under the pressure head determined by the height of the stand-pipe nipple 22, for impingement against the lower end of a solid chlorine compound stick indicated by the numeral 32. For supporting the lower ends of the solid chlorine compound sticks 32 in substantial registration with the plane of the jet ports 31, a central vertical rod 34 is provided extending upwardly from the transverse wall 11 to a height slightly below the plane of the bottom of the jet ports 31. Treated water is delivered from the tubes 15 through the discharge ports to the outlet chamber 12.

The treated water is discharged from the delivery chamber 12 through a delivery tube 35. However, it has been found advantageous to restrict the discharge of water from the chamber 12 to periods when a predetermined volume or head of water has accumulated in the chamber. This is particularly true, if not a requirement, where the delivery tube 35 is directly connected, without intervening safeguards, to the suction side of the circulation pump. In such a case should the suction be applied while no water was in the chamber 12, air could be drawn into the pump chamber to produce a vapor or air lock in the pump requiring a repriming of the pump to restore normal operation.

Therefore, a liquid response flow control float is mounted within the chamber 12. A presently suggested float construction is the use of a bouyant body 40 of cellular polystyrene secured on a valve rod 41 between securing plates 42. The upper end of the valve rod 41 is loosely confined within a short guide cylinder 43 depending from the central underface of the transverse wall 11. The lower end of the valve rod 41 fits loosely within the vertical valve chamber 44 of a valve block 45 and terminates in a generally tapering or conical valve element 46 which forms a shoulder 47 at its juncture with the uniformly cylindrical valve rod 41. The valve seat is formed by an O-ring 48 mounted within a seating recess 49 of the chamber 44. Below the O-ring valve seat the valve chamber 44 is in open communication with the delivery tube 35.

An important feature of the design of the valve block 45 is the arrangement of lateral inlet ports 50 opening into the vertical valve chamber 44. The ports 50 are multiple and circumferentially spaced equally. As an illustration the ports 50 are shown as four in number to provide two pairs of dimetrically opposite ports, each port being spaced 90° from the other. Thus the fluid pressure on the valve stem 41 is balanced. As will be noted, the valve stem 41 and its float 40 are free floating by virtue of the loose fit of the stem within the valve chamber 44. The balanced lateral pressure thus insures a straight rectilinear movement of the stem without friction imposing and movement retarding guides. This construction not only insures a sensitive responsive movement of the valve to the liquid level within the chamber 12, but also insures uniform responsive flow proportionate to the height of the stem 41 within the valve chamber 44. Further, the flow is non-turbulent, the balanced admission from all sides insuring such even smooth flow free from eddies and churning.

While the construction of the chamber has been defined as cylindrical with the cylinder 10 divided by the transverse wall 11, the details of construction here exemplifying such construction include an upper cylindrical section 10a defining the chamber 14 and a lower cylindrical section 10b defining the chamber 12. The transverse wall 11 between the cylinder sections is a plate with mating upper and lower circular grooves 50 and 51, respectively, to receive the lower edge of the upper section 10a and the upper edge of the lower section 10b, respectively. These lower and upper edges are formed with bosses 52 conforming with periphery of the transverse wall plate. A united assembly is effected by tie bolts 53 extending through the bosses, the peripheral edge of the transverse wall plate and threadedly engage the shoulder of the while their heads threadedly engage the shoulder of the other. The chamber 12 formed by the lower cylindrical section 10a is closed at the bottom by a grooved bottom plate 54 similar to the top 16 and constitutes a support for the valve body 45.

The sticks 32 are here shown as generally cylindrical and of uniform diameter. One material which has been successfully used in forming the stocks is dichloro-s-triazinetrione. This material with a two percent inert binder is formed into the cylindrical sticks by any suitable procedure such as molding or extrusion. The term relatively insoluble is used as a comparison with such readily soluble chlorine materials such as liquid sodium hypochlorite or granular calcium hypochlorite used in the chlorination of swimming pools.

In the operation of the treatment chamber, the swimming pool water is delivered to the chamber 14 through the supply pipe 20 at such pressure as to reach a level above the jet ports 31 and preferably at a level approxi-nipple, such water wil drain down through the stand-pipe nipple 22. Should the pressure of the water supply, through the supply pipe 20, be such as to attempt to build up a water level above the open end of the stand-pipe niple, such water will drain down through the stand-pipe to be delivered from the chamber 12. Thus, the height of the stand-pipe will determine the maximum head of water within the upper chamber 14 and hence the maximum pressure of the water at the jet ports 31.

With the sticks 32 of solid chlorine compound positioned within the tubes 15 resting upon the support rods 34, by which the lower ends of the sticks 32 are at all times located closely adjacent the plane of the jet ports 31, the swimming pool water to be treated will impinge against the lower ends of the sticks to dissolve and/or erode the material of the sticks, thus impregnating the water with the chlorine compound. An important feature of the present invention is the uniform circumferential spacing of the jet ports 31 whereby the dissolution and/or erosion of the lower end of the sticks is uniform throughout their circumference. Such a uniformity of dissolution and/or erosion insures a uniformity of the degree of saturation of the pool water as it passes from the tubes 15. Should the water be impinged at only one point, or against only one side of a stick, the area of the contact changes as the stick is dissolved and/or eroded and hence a variable degree of saturation would ensue. Further, the uniform evenly distributed circumferential pressure exerted by the jets tends to maintain the stick in a free central location within the tube.

By the provision of the adjustable standpipe nipple 22, the applied jet pressure may be varied to control the dissolution and/or erosion rate and preclude the build up of excessive pressure. This important feature of the invention is accomplished by a simple means readily adjustable during operation of the treatment chamber by an external manually operable means.

By virtue of the unique structural arrangement and function of the float valve, air suction through the treatment chamber is positively precluded. Further, suction applied to the chamber 12 is not permitted to alter the established jet pressure or otherwise affect the dissolution and/or erosion rate or in any other manner influence the operations within the chamber 14. In this connection it is to be noted that while the float valve is incorporated as a safety means where suction is applied for withdrawing treated water from the chamber 12, its presence in no way interferes with a gravity flow from the chamber 12. It will, of course, defer such flow until the predetermined water level is established; however, thereafter a consistent gravity flow or suction flow may take place. As has been noted, the spacing of the lateral ports of the valve body insures a uniform turbulent free flow without reference to pressure conditions within chamber 12.

Thus, it will be seen that the treatment chamber of the present invention provides a simple, effective and efficient means for the uniform chlorination of swimming pool waters and may be utilized with either suction discharge or gravity discharge. It will be understood that the unit of the present invention may lend itself to application of various types of recirculating apparatus, both in conjunction with filter systems and independently thereof. It will be obvious to those skilled in the art that many variations may be made in the arrangement here chosen for the purpose of illustrating the operation of the present invention without departing from the scope thereof as defined by the appended claims.

What is claimed as invention is:

1. A device for feeding chemicals into a liquid by impinging a plurality of jets of liquid against the lower end portion of a solid body of said chemicals comprising;

(A) an upper chamber having liquid inlet means, (B) a lower chamber having liquid outlet means, (C) at least one hollow member for receiving said solid body of chemicals, said member being positioned within said upper chamber with its lower end in communication with said lower chamber and having a plurality of laterally directed jet-forming orifices uniformly spaced around its circumference in a region generally corresponding to the lower portion of said upper chamber, (D) and stationary means positioned within said hollow member for continuously supporting said solid body of chemicals with its lower end substantially opposite said plurality of orifices whereby liquid received in said upper chamber will jet through said orifices against said solid body of chemicals to cause generally uniform and progressive erosion of said body and thereafter passing into said lower chamber and out said outlet means.

2. A device according to claim 1 wherein regulator means are provided in said upper chamber to control the pressure of said liquid passing through said jet-forming orifices independent of the pressure of the fluid passing through said fluid inlet means into said upper chamber.

3. A device according to claim 2 wherein said regulator means comprises a stationary hollow standpipe member mounted within said upper chamber and having its interior passage in communication with said lower chamber, a slidable hollow standpipe member mounted in sealing engagement on the upper end of said stationary hollow standpipe member, and means for slidably positioning said slidable hollow standpipe member with respect to said stationary hollow standpipe member whereby the effective height of the standpipe may be varied and the level of liquid in said upper chamber controlled.

References Cited

UNITED STATES PATENTS

| 521,411 | 6/1894 | Johnson | 4—225 |
|---|---|---|---|
| 2,538,720 | 1/1951 | Wood | 23—272.8 |
| 2,540,361 | 2/1951 | Whitley | 137—426 X |
| 2,690,764 | 10/1954 | Hoffmann | 137—563 |
| 2,700,651 | 1/1955 | Tepas et al. | 23—272 |
| 3,094,134 | 6/1963 | Curvie | 137—268 X |
| 3,107,156 | 10/1963 | Fredricks | 23—267 |
| 3,203,440 | 8/1965 | Schneider | 137—268 |

M. CARY NELSON, *Primary Examiner.*

MARTIN P. SCHWADRON, R. J. MILLER,
*Assistant Examiners.*